(12) United States Patent
Hsu (10) Patent No.: US 7,659,883 B2
(45) Date of Patent: Feb. 9, 2010

(54) JOYSTICK DEVICE CONFIGURED WITH A MOUSE UNIT

(75) Inventor: Jason Hsu, Taipei (TW)

(73) Assignee: Tech-Way Computer Co., Ltd., Shanghai (CN)

( * ) Notice: Subject to any disclaimer, the term of this patent is extended or adjusted under 35 U.S.C. 154(b) by 659 days.

(21) Appl. No.: 11/385,246

(22) Filed: Mar. 20, 2006

(65) Prior Publication Data

US 2007/0216645 A1 Sep. 20, 2007

(51) Int. Cl.
*G09G 5/08* (2006.01)
*G06F 3/033* (2006.01)

(52) U.S. Cl. .................. 345/161; 463/38; 345/156; 345/157

(58) Field of Classification Search .......... 345/156, 345/157, 161, 163; 463/38
See application file for complete search history.

(56) References Cited

U.S. PATENT DOCUMENTS

| 5,903,257 | A  | * | 5/1999  | Nishiumi et al. ............ 345/157 |
| 5,963,196 | A  | * | 10/1999 | Nishiumi et al. ............ 345/161 |
| 5,984,785 | A  | * | 11/1999 | Takeda et al. ............... 463/38 |
| 6,102,803 | A  | * | 8/2000  | Takeda et al. ............... 463/38 |
| 6,186,896 | B1 | * | 2/2001  | Takeda et al. ............... 463/38 |
| 6,222,525 | B1 | * | 4/2001  | Armstrong ................. 345/161 |
| 6,264,558 | B1 | * | 7/2001  | Nishiumi et al. ............ 463/36 |
| 6,362,810 | B1 | * | 3/2002  | Matsuda .................... 345/161 |
| 6,452,587 | B1 | * | 9/2002  | Nikom ....................... 345/167 |
| 6,462,731 | B1 | * | 10/2002 | Stoffers et al. .............. 345/161 |
| 6,497,618 | B1 | * | 12/2002 | Nishiumi et al. ............. 463/36 |
| 6,595,914 | B2 | * | 7/2003  | Kato ......................... 600/152 |
| 6,906,700 | B1 | * | 6/2005  | Armstrong ................. 345/161 |
| 7,109,971 | B2 | * | 9/2006  | Furukawa ................... 345/161 |
| 2001/0021668 | A1 | * | 9/2001 | Takeda et al. ................ 463/38 |
| 2006/0135257 | A1 | * | 6/2006 | Nourry et al. ................ 463/38 |
| 2006/0238505 | A1 | * | 10/2006 | Ahlgren et al. ............. 345/161 |

FOREIGN PATENT DOCUMENTS

| DE | 4447103 A1 | * | 11/1995 |
| DE | 19825285 A1 | * | 12/1999 |
| EP | 545832 A1 | * | 6/1993 |
| EP | 771015 A1 | * | 5/1997 |
| EP | 947949 A1 | * | 10/1999 |

* cited by examiner

*Primary Examiner*—Amare Mengistu
*Assistant Examiner*—Gene W Lee
(74) *Attorney, Agent, or Firm*—Kirschstein, et al.

(57) ABSTRACT

A joystick device includes a base, an upright joystick handle disposed pivotally on the base and operable to generate a first input signal, and a mouse unit disposed on a top end of the joystick handle and operable to generate a second input signal. An output unit is disposed on the base. A control unit is disposed on the base and connected to the joystick handle, the mouse unit, and the output unit. When the joystick handle is operated, the control unit receives the first input signal from the joystick handle so as to output a first output signal via the output unit. When the mouse unit is operated, the control unit receives the second input signal from the mouse unit so as to output a second output signal via the output unit. A power source supplies electric power to the control unit.

11 Claims, 7 Drawing Sheets

JOYSTICK DEVICE CONFIGURED WITH A MOUSE UNIT

BACKGROUND OF THE INVENTION

1. Field of the Invention

This invention relates to a joystick, and more particularly to a joystick device configured with a mouse unit.

2. Description of the Related Art

Joysticks and mice are used in various applications, e.g., for controlling the movement of figures or objects in a video game. When using a computer to play different types of video games, a joystick and a mouse may be used in combination as an operating unit for playing the video games. Such utilization of two separate devices, however, results in an increase in costs for the user, as well as an increase in the space occupied by the operating unit.

SUMMARY OF THE INVENTION

The object of this invention is to provide a joystick device that includes a mouse unit, which is disposed on a top end of a joystick handle, thereby reducing the manufacturing costs of the joystick device and the space occupied by the control assembly required to play video games.

According to this invention, an joystick device includes a base, an upright joystick handle disposed pivotally on the base and operable to generate a first input signal, and a mouse unit disposed on a top end of the joystick handle and operable to generate a second input signal. An output unit is disposed on the base. A control unit is disposed on the base and connected to the joystick handle, the mouse unit, and the output unit. When the joystick handle is operated, the control unit receives the first input signal from the joystick handle so as to output a first output signal via the output unit. When the mouse unit is operated, the control unit receives the second input signal from the mouse unit so as to output a second output signal via the output unit. A power source supplies electric power to the control unit.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 6:
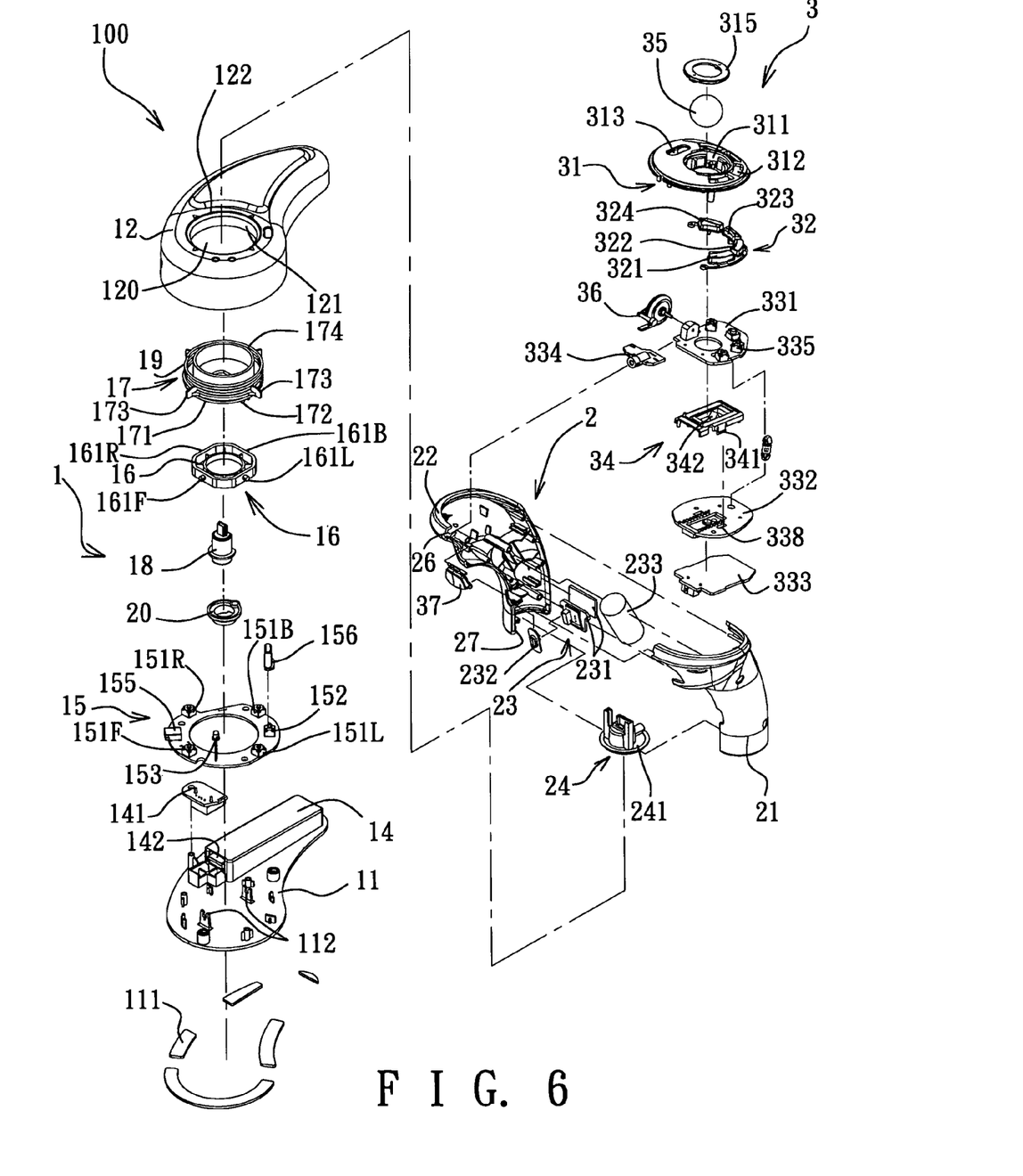
FIG. 6 is an exploded front perspective view of the preferred embodiment.

Referring to FIGS. 1 to 5, the preferred embodiment of a joystick device according to this invention includes a base 1, an upright joystick handle 2, a mouse unit 3, a control unit 4, an output unit 5, and a power source configured as a battery set 233 (see FIG. 6).

The joystick handle 2 is disposed pivotally on the base 1, and is operable to generate a first input signal. The mouse unit 3 is disposed on a top end of the joystick handle 2, and is operable to generate a second input signal. The output unit 5 is disposed on the base 1. The control unit 4 is disposed on the base 1, and is connected to the joystick handle 2, the mouse unit 3, and the output unit 5. When the joystick handle 2 is operated, the control unit 4 receives the first input signal from the joystick handle 2 so as to output a first output signal via the output unit 5. When the mouse unit 3 is operated, the control unit 4 receives the second input signal from the mouse unit 3 so as to output a second output signal via the output unit 5. The battery set 233 supplies electric power to the control unit 4. A switch unit 23 (see FIG. 1) is disposed between the battery set 233 and the control unit 4 for controlling supply of electric power from the battery set 233 to the control unit 4. The switch unit 23 may also control the supply of electric power to other elements of the joystick device in a known manner.

Figure 7:
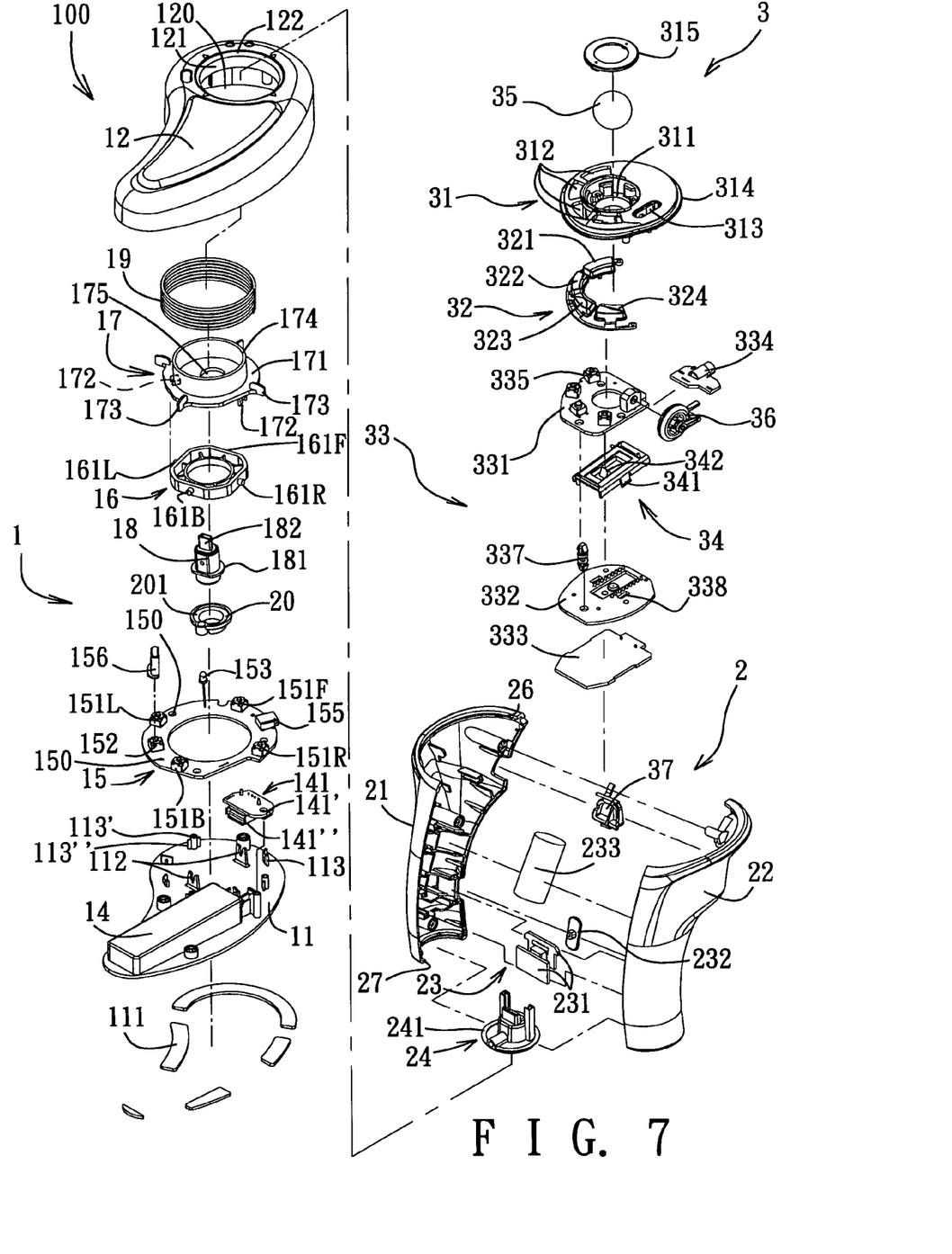
FIG. 7 is an exploded rear perspective view of the preferred embodiment.

With further reference to FIGS. 6 and 7, the base 1 includes a bottom plate 11 and a top cover 12. A plurality of anti-skid pads 111 are attached to an outer periphery of a bottom surface of the bottom plate 11, and are made of rubber. A pair of aligned front and rear U-shaped brackets 112 and a plurality of supporting spacers 113 are disposed fixedly on a top surface of the bottom plate 11. Each of the supporting spacers 113 has a vertical middle rod 113' and two vertical side plates 113" flanking and formed integrally with the middle rod 113'. The top cover 12 is disposed above and connected fixedly to the bottom plate 11 by bolts (not shown), and has a vertical circular hole 120 defined by a cylindrical inner wall surface 121, and an inward flange 122 extending radially and inwardly from a top end of the inner wall surface 121.

Between the bottom plate 11 and the top cover 12, there is provided an annular circuit board 15 that is formed with a plurality of circular holes 150 engaging respectively the middle rods 113' of the supporting spacers 113 of the bottom plate 11. The annular circuit board 15 has a bottom surface abutting against top ends of the side plates 113" of the supporting spacers 113, and includes angularly equidistant front, rear, left, and right microswitches (151F, 151B, 151L, 151R) disposed on a top surface thereof, and a circuit (not shown) connected electrically to the front, rear, left, and right microswitches (151F, 151B, 151L, 151R). Also on the top surface of the annular circuit board 15, an additional microswitch 152 is disposed between the left and rear microswitches (151L, 151B), and a state-indicating member 153 is disposed between the front and left microswitches (151F, 151L) and configured as a light emitting diode for indicating the ON/OFF state of the switch unit 23. A function button 156 is disposed on the top cover 12, and is operable to contact the microswitch 152. The connecting member 141 has a top plate portion 141' welded to a bottom surface of the annular circuit board 15, and a lower socket portion 141".

The base 1 further includes an annular lower swing member 16, an upper swing member 17, a second connecting member 18, a coiled compression spring 19, and an annular positioning seat 20. The lower swing member 16 has an annular outer surface that is formed with two aligned first pivot pins (161F, 161B) and two aligned second pivot pins (161L, 161R). The first pivot pins (161F, 161B) are disposed respectively and rotatably on the U-shaped brackets 112 of the bottom plate 11 so as to allow for rotation of the lower swing member 16 about the first pivot pins (161F, 161B). The second pivot pins (161L, 161R) are perpendicular to the first pivot pins (161F, 161B). The lower swing member 16 extends through the annular circuit board 15. The U-shaped brackets 112 of the bottom plate 11 are disposed between the annular circuit board 15 and the lower swing member 16. The upper swing member 17 includes a generally horizontal base wall 171 and a cylindrical surrounding wall 174 extending upwardly from the base wall 171. The base wall 171 is formed with two inverted U-shaped rider members 172 disposed fixedly on a bottom surface thereof, and four contact members 173 extending radially and outwardly from an outer periphery of the base wall 171. The rider members 172 are disposed respectively and rotatably on the second pivot pins (161L, 161R) of the lower swing member 16 so as to allow for rotation of the upper swing member 17 about the second pivot pins (161L, 161R). The coiled compression spring 19 is sleeved on the surrounding wall 174 of the upper swing member 17, and has an upper end abutting against a bottom surface of the inward flange 122 of the top cover 12, and a lower end abutting against an outer peripheral portion of a top surface of the base wall 171. As such, the upper swing member 17 is biased toward a predetermined position within the circular hole 120 in the top cover 12, and each of the contact members 173 is pivotable to contact the corresponding microswitch (151F, 151B, 151L, 151R). The annular positioning seat 20 is connected fixedly to the bottom surface of the base wall 171 by bolts (not shown). The second connecting member 18 extends through the positioning seat 20 and a central hole 175 in the base wall 171 of the upper swing member 17, and has an outwardly extending flange 181 formed on a lower end portion thereof and abutting against a shoulder 201 of the positioning seat 20, a conducting upper end 182 disposed in the surrounding wall 174 of the upper swing member 17, and a lower end electrically coupled to the annular circuit board 15 by means of a conductive wire (not shown).

Figure 1:
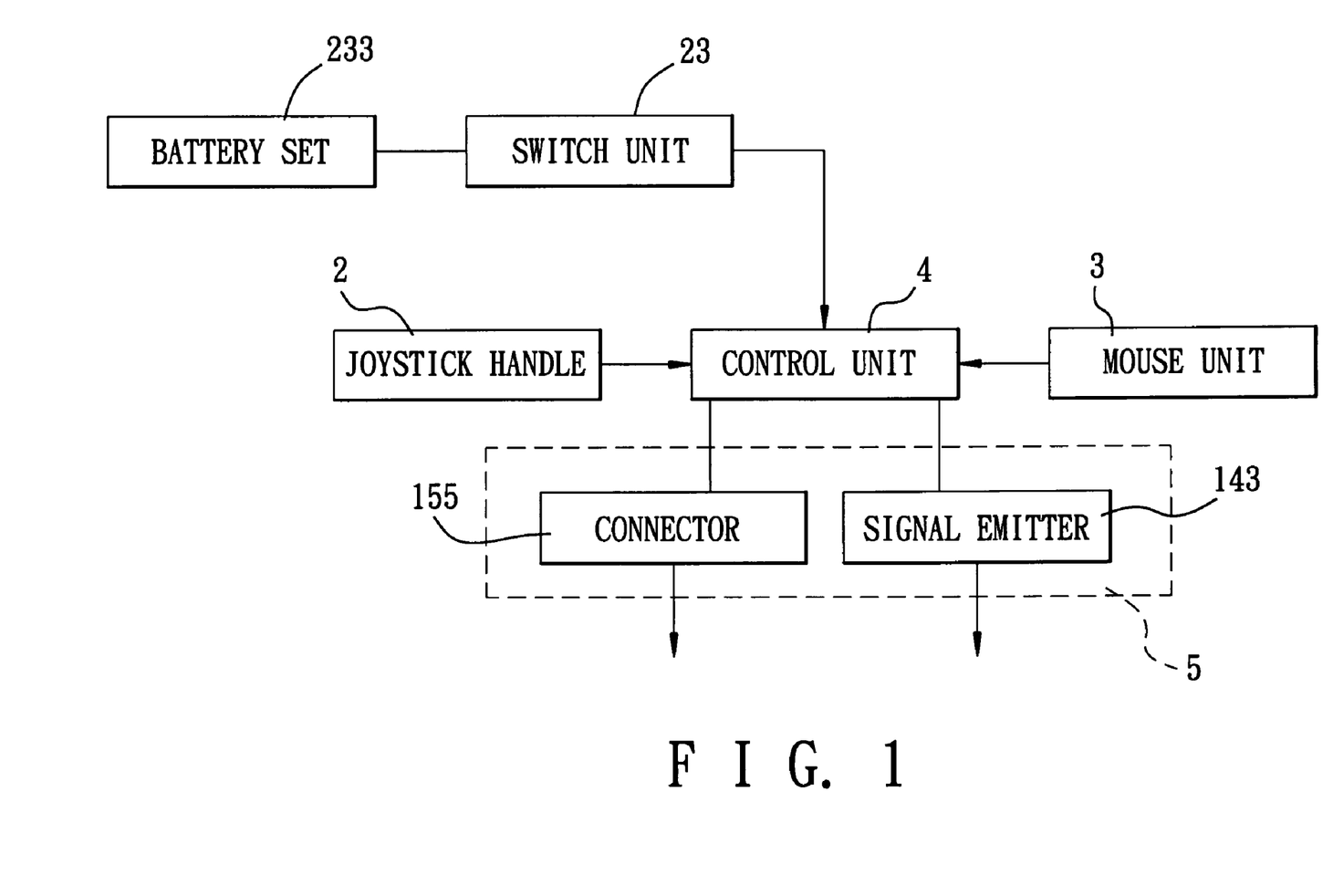
FIG. 1 is a schematic circuit block diagram of the preferred embodiment of a joystick device according to this invention.

The output unit 5 includes an electrical connector 155 and a signal emitter 143 (see FIG. 1). The electrical connector 155 is disposed on the top surface of the annular circuit board 15 between the front and right microswitches (151F, 151R), and is connected electrically to the circuit board 15 for transmitting the first and second output signals to a computer (not shown). The signal emitter 143 is disposed on the bottom plate 11, and is also connected electrically to the circuit board 15 for emitting the second output signals. An electrical plug 142 of the signal emitter 143 is inserted into the lower socket portion 141" of the first connecting member 141 so as to establish electrical connection between the signal emitter 143 and a circuit formed by the elements on the annular circuit board 15. A casing 14 is disposed fixedly on the bottom plate 11, and houses the signal emitter 143 and a circuit (not shown) that is disposed between the electrical plug 142 and the signal emitter 143.

Figure 2:
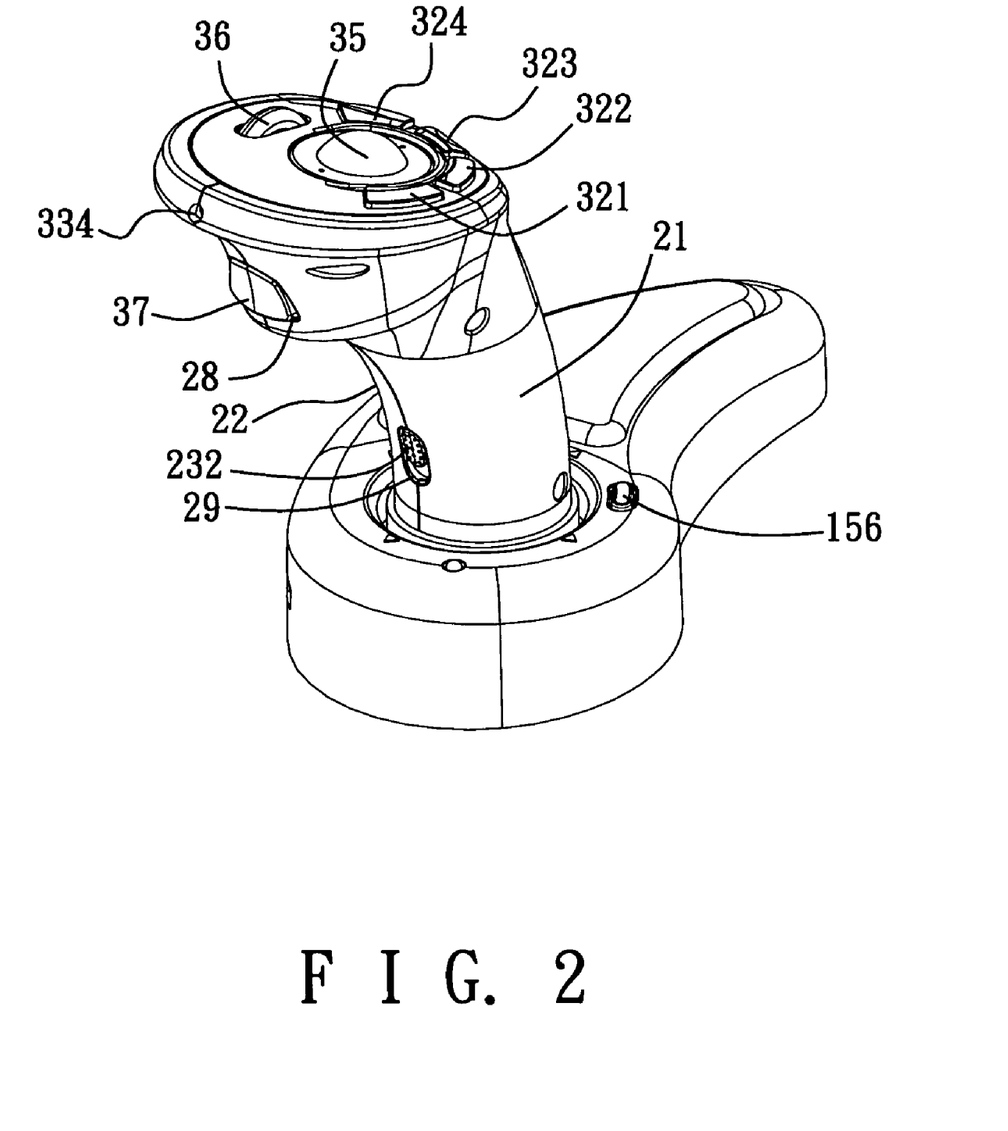
FIG. 2 is an assembled front perspective view of the preferred embodiment.
Figure 3:
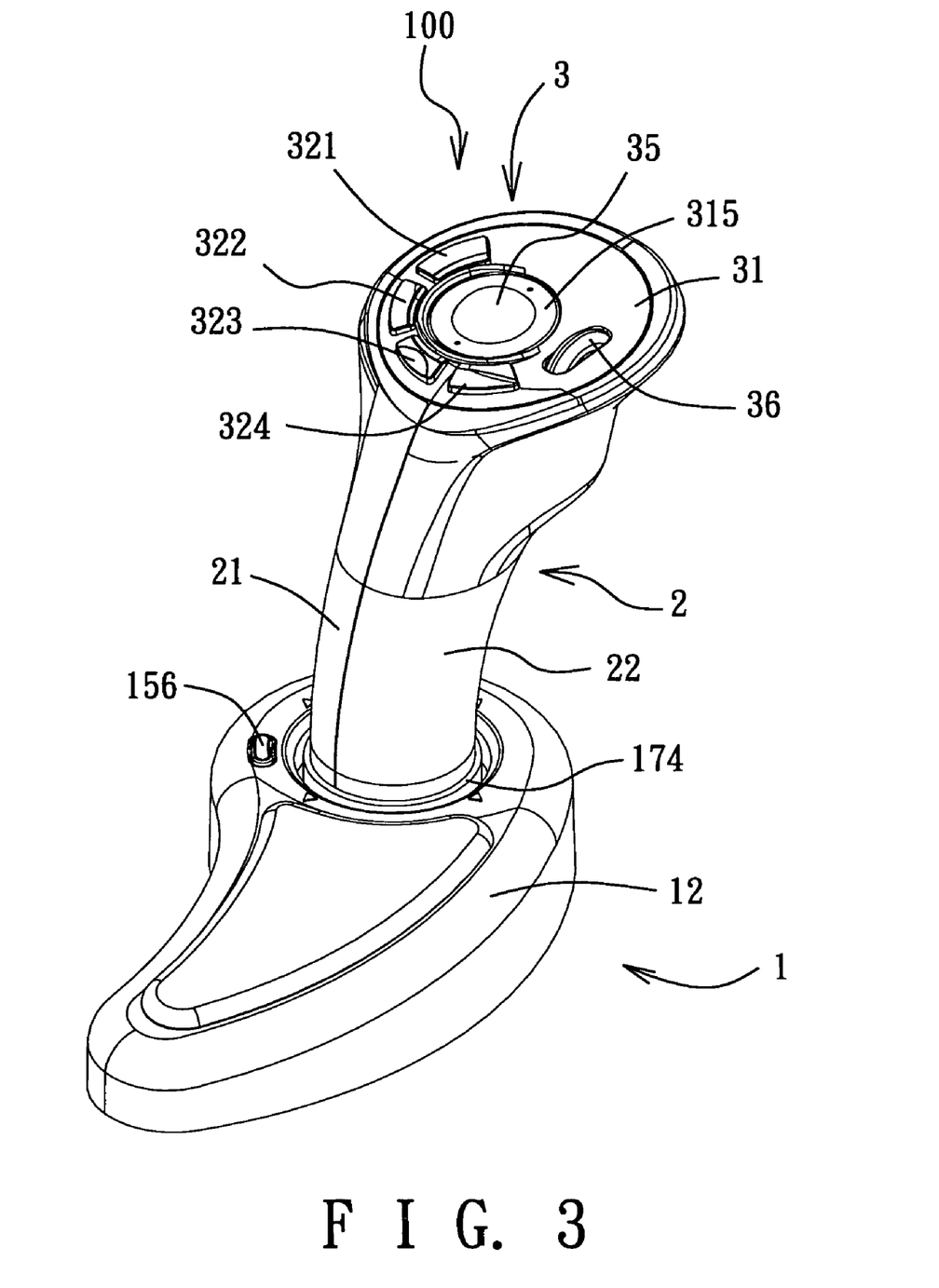
FIG. 3 is an assembled rear perspective view of the preferred embodiment.
Figure 4:
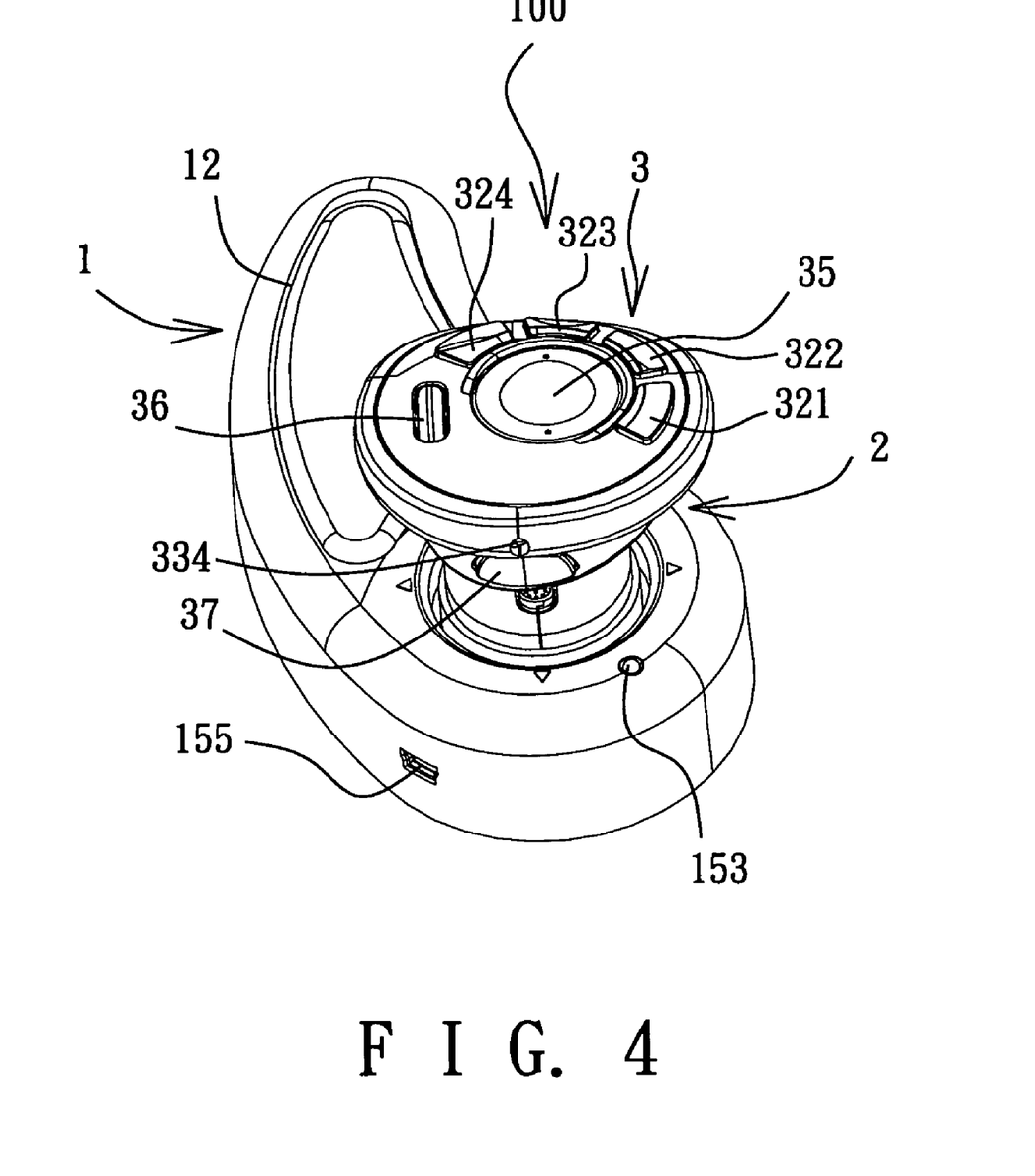
FIG. 4 is an assembled top perspective view of the preferred embodiment.
Figure 5:
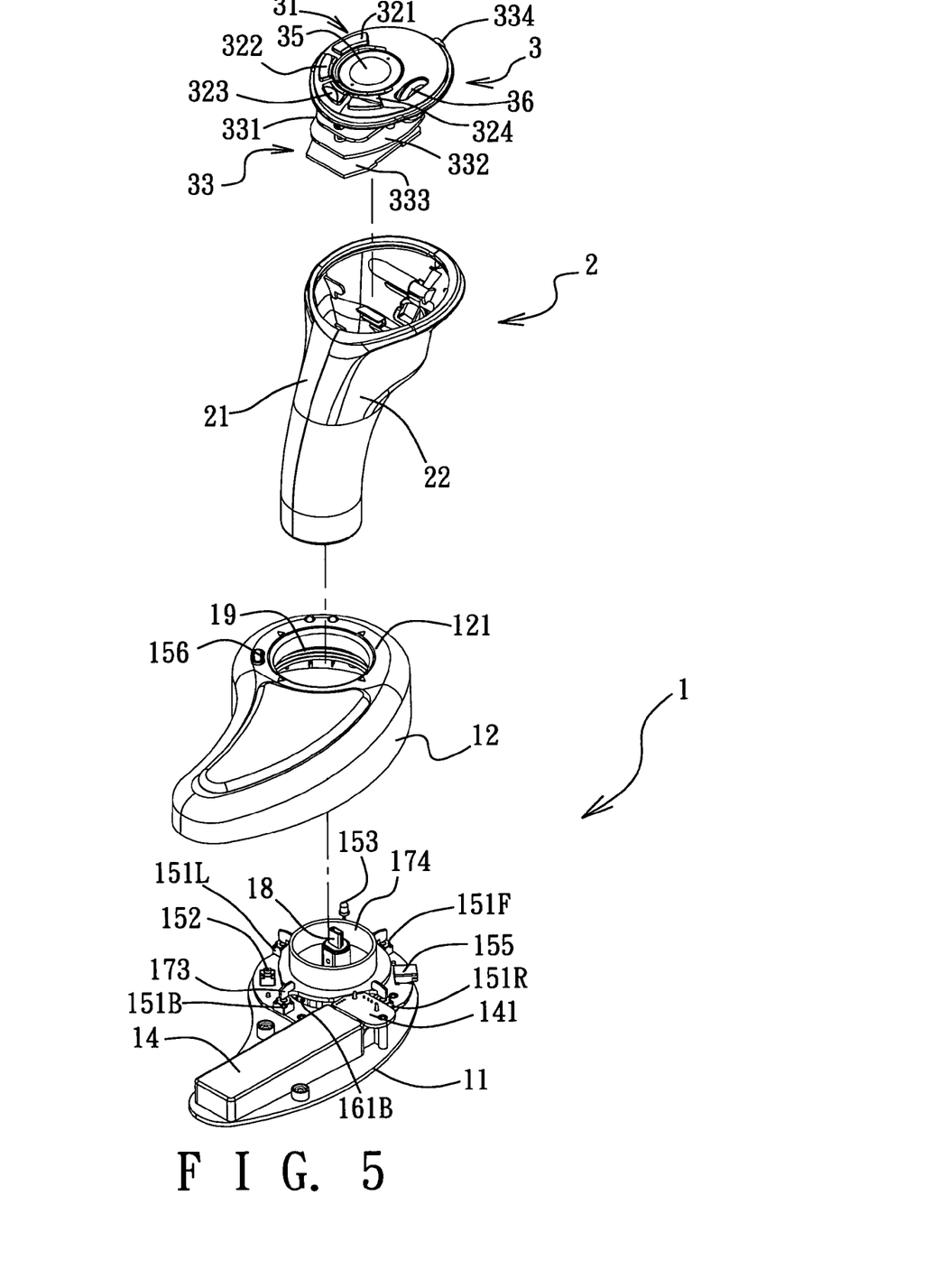
FIG. 5 is a partly exploded perspective view of the preferred embodiment.

The switch unit 23 and the battery set 233 are disposed in the joystick handle 2. The switch unit 23 includes a circuit board unit 231 and an ON/OFF switch 232. The joystick handle 2 includes interconnected left and right housings 21, 22, and is formed with an upper opening 28 and a lower opening 29, as shown in FIG. 2. The ON/OFF switch 232 is disposed within the lower opening 29. Each of the left and right housings 21, 22 is formed with upper and lower end grooves 26, 27. A lower end of an assembly of the left and right housings 21, 22 is fitted within the surrounding wall 174 of the upper swing member 17. This allows for synchronous movement of the upper swing member 17 and the joystick handle 2. A third connecting member 24 has a bottom disk portion 241 in electrical connection with the upper end 182 of the second connecting member 18, and an upper portion in electrical connection with the switch unit 23. The bottom disk portion 241 has an outer periphery engaging the lower end grooves 27 in the left and right housings 21, 22.

The mouse unit 3 includes a cover 31, a function button unit 32, a ball supporter 34, a tracing ball 35, an encoder wheel 36, and a trigger button 37. The cover 31 has a ball hole 311 adjacent to the center thereof, a plurality of buttonholes 312, and a wheel hole 313. An outer periphery 314 of the cover 31 engages the upper end grooves 26 in the left and right housings 21, 22. The function button unit 32 includes a plurality of function buttons 321, 322, 323, 324 disposed respectively within the buttonholes 312 in the cover 31 and serving respectively as a page-up button, a page-down button, a mouse middle button, and a mouse right button. The tracing ball 35 is confined within the ball hole 311 in the cover 31 by a retaining ring 315, and is in contact with a projection 342 of the ball supporter 34. The encoder wheel 36 is disposed rotatably within the wheel hole 313 in the cover 31. The trigger button 37 is disposed within the upper opening 28 in the joystick handle 2.

The mouse unit 3 further includes a circuit board unit 33 consisting of first, second, and third circuit boards 331, 332, 333 arranged one above the other and interconnected electrically. The ball supporter 34 has two opposite sides that are formed respectively with two downwardly extending hooks 341, which engage respectively two holes 338 in the second circuit board 332 so as to prevent removal of the second circuit board 332 from the ball supporter 34. The encoder wheel 36 is connected to the first circuit board 331. The tracing ball 35 is associated with sensors (not shown) disposed in the ball hole 311 in the cover 31 so as to transmit signals to the second circuit board 332 when manipulated by a user. The function button unit 32 is connected to the third circuit board 333. The function button unit 32, the tracing ball 35, the encoder wheel 36, and the trigger button 37 constitute a mouse input unit, which is operable to generate the first input signal. The first input signal is transmitted to the annular circuit board 15 via a transmission path defined by the switch unit 23, the third connecting member 24, and the second connecting member 18.

The joystick handle 2 and the function button 156 constitute a joystick input unit, which is operable so as to activate an assembly of the front, rear, left, and right microswitches (151F, 151B, 151L, 151R), as well as the microswitch 152 to generate the second input signal.

In view of the above, since the mouse unit 3 is disposed on the top end of the joystick handle 2, costs for the user and the space occupied by the control assembly for video games can be reduced significantly.

With this invention thus explained, it is apparent that numerous modifications and variations can be made without departing from the scope and spirit of this invention. It is therefore intended that this invention be limited only as indicated by the appended claims.

I claim:

1. A joystick device comprising:
  a base;
  an upright joystick handle disposed pivotally on said base and operable to generate a first input signal;
  a mouse unit disposed on a top end of said joystick handle and operable to generate a second input signal;
  an output unit disposed on said base;
  a control unit disposed on said base and connected to said joystick handle, said mouse unit, and said output unit such that, when said joystick handle is operated, said control unit receives said first input signal from said joystick handle so as to output a first output signal via said output unit, and when said mouse unit is operated, said control unit receives said second input signal from said mouse unit so as to output a second output signal via said output unit; and a power source for supplying electric power to said control unit;

wherein said base includes:

a bottom plate including two aligned U-shaped brackets disposed fixedly on a top surface thereof;

a top cover disposed above and connected fixedly to said bottom plate;

four microswitches disposed on said bottom plate and connected electrically to said control unit;

an annular lower swing member formed with two aligned first pivot pins disposed respectively and rotatably on said U-shaped brackets of said bottom plate so as to allow for rotation of said lower swing member about said first pivot pins, and two aligned second pivot pins perpendicular to said first pivot pins; and an upper swing member formed with two inverted U-shaped rider members disposed respectively and rotatably on said second pivot pins of said lower swing member so as to allow for rotation of said upper swing member about said second pivot pins, and four contact members, each of which is pivotable to contact a corresponding one of said microswitches.

2. The joystick device as claimed in claim 1, wherein said output unit includes an electrical connector connected electrically to said control unit for transmitting said first and second output signals.

3. The joystick device as claimed in claim 1, wherein said output unit includes a signal emitter connected electrically to said control unit for emitting said first and second output signals.

4. The joystick device as claimed in claim 1, wherein said output unit includes an electrical connector and a signal emitter that are connected electrically to said control unit for transmitting said first and second output signals.

5. The joystick device as claimed in claim 1, wherein said top cover has a vertical circular hole defined by a cylindrical inner wall surface, and an inward flange extending radially and inwardly from a top end of said inner wall surface;

said upper swing member includes a generally horizontal base wall, and a cylindrical surrounding wall extending upwardly from said base wall, said contact members extending radially and outwardly from an outer periphery of said base wall, said rider members being disposed fixedly on a bottom surface of said base wall; and said base further includes a coiled compression spring sleeved on said surrounding wall of said upper swing member and having an upper end abutting against a bottom surface of said inward flange of said top cover, and a lower end abutting against an outer peripheral portion of a top surface of said base wall so as to bias said upper swing member toward a predetermined position within said circular hole in said top cover.

6. The joystick device as claimed in claim 1, wherein said control unit includes an annular circuit board disposed fixedly on said bottom plate, said lower swing member extending through said circuit board, said U-shaped brackets of said bottom plate being disposed between said annular circuit board and said lower swing member, said microswitches being disposed equiangularly on said circuit board.

7. The joystick device as claimed in claim 6, wherein said output unit includes an electrical connector disposed on said circuit board and connected electrically to said circuit board for transmitting said first and second output signals.

8. The joystick device as claimed in claim 7, wherein said output unit further includes a signal emitter disposed on said bottom plate and connected electrically to said circuit board for emitting said first and second output signals.

9. The joystick device as claimed in claim 8, wherein said control unit further includes a connecting member welded to said circuit board and connected electrically to said signal emitter so as to establish electrical connection between said circuit board and said signal emitter.

10. The joystick device as claimed in claim 1, wherein said power source is configured as a battery set disposed in said joystick handle.

11. The joystick device as claimed in claim 1, further comprising a switch unit disposed between said power source and said control unit for controlling supply of electric power from said power source to said control unit.

\* \* \* \* \*